(12) United States Patent
Fujiwara (10) Patent No.: US 7,529,640 B2
(45) Date of Patent: May 5, 2009

(54) METHOD OF CALCULATING AN ANGLE OF INCLINATION AND APPARATUS WITH A THREE-AXIS ACCELERATION SENSOR

(75) Inventor: Kazunori Fujiwara, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 0 days.

(21) Appl. No.: 11/730,631

(22) Filed: Apr. 3, 2007

(65) Prior Publication Data

US 2007/0233425 A1 Oct. 4, 2007

(30) Foreign Application Priority Data

Apr. 4, 2006 (JP) .............................. 2006-103250

(51) Int. Cl.
*G01C 9/00* (2006.01)
*G01C 19/00* (2006.01)

(52) U.S. Cl. ..................... 702/151; 702/154; 702/127; 702/141; 702/150; 702/189

(58) Field of Classification Search ................. 702/151, 702/154, 141, 142, 150, 153, 183, 189, 41, 702/127; 348/208.11; 382/202; 708/200–204, 708/446; 73/510, 511, 382 R; 33/1 M, 1 PT
See application file for complete search history.

(56) References Cited

U.S. PATENT DOCUMENTS 5,774,373 A * 6/1998 Northcutt ................. 702/154

| | | | | |
|---|---|---|---|---|
| 5,983,157 A * | 11/1999 | Sugitani | ................. | 701/207 |
| 6,636,826 B1 * | 10/2003 | Abe et al. | ................. | 702/151 |
| 6,813,584 B2 * | 11/2004 | Zhou et al. | ................. | 702/151 |
| 6,992,700 B1 * | 1/2006 | Sato et al. | ................. | 348/208.2 |
| 7,325,454 B2 * | 2/2008 | Saito et al. | ................. | 73/511 |
| 2005/0268717 A1 | 12/2005 | Ozawa | | |
| 2007/0214888 A1 | 9/2007 | Nomura | | |

FOREIGN PATENT DOCUMENTS

JP 2000-180462 6/2000
JP 2004198243 7/2004

* cited by examiner

*Primary Examiner*—Eliseo Ramos Feliciano
*Assistant Examiner*—Mi'schita' Henson
(74) *Attorney, Agent, or Firm*—Studebaker & Brackett PC; Donald R. Studebaker (57) ABSTRACT

A sensor apparatus for calculating an angle of inclination includes a three-axis acceleration sensors used for sensing acceleration and resolving the acceleration into a first acceleration component in a first axis direction, a second acceleration component in a second axis direction perpendicular to the first axis direction, and a third acceleration component in a third axis direction perpendicular to a plane formed by the first and second axes. A calculator compares absolute values of the first, second, and third acceleration components with each other to calculate a first angle of inclination from one of the three acceleration components that is largest in absolute value and one of the remaining two acceleration components, and calculate a second angle of inclination from the one acceleration component largest in absolute value and the other of the two acceleration components.

5 Claims, 4 Drawing Sheets

METHOD OF CALCULATING AN ANGLE OF INCLINATION AND APPARATUS WITH A THREE-AXIS ACCELERATION SENSOR

BACKGROUND OF THE INVENTION

1. Field of the Invention

The present invention relates to a calculator apparatus for calculating an angle of inclination capable of more accurately sensing an angle of inclination when measuring the attitude of an object in space, and also to a method therefor.

2. Description of the Background Art

As means for sensing an inclination of an object in a three-dimensional space, it is known to make use of a micromachining sensor that employs a micro-electromechanical system (MEMS) such as a three-axis acceleration sensor. For example, when accelerated in space, the three-axis acceleration sensor has ability to resolve and sense the acceleration into three acceleration components in X-, Y- and Z-axis directions. Utilizing this principle and based on the gravitational acceleration components in the X-, Y- and Z-axis directions sensed by the three-axis acceleration sensor, it is calculated how much the three-axis acceleration sensor is inclined with respect to the direction of gravitation, whereby it can be found how much an object with the three-axis acceleration sensor is inclined in space.

Figure 3:
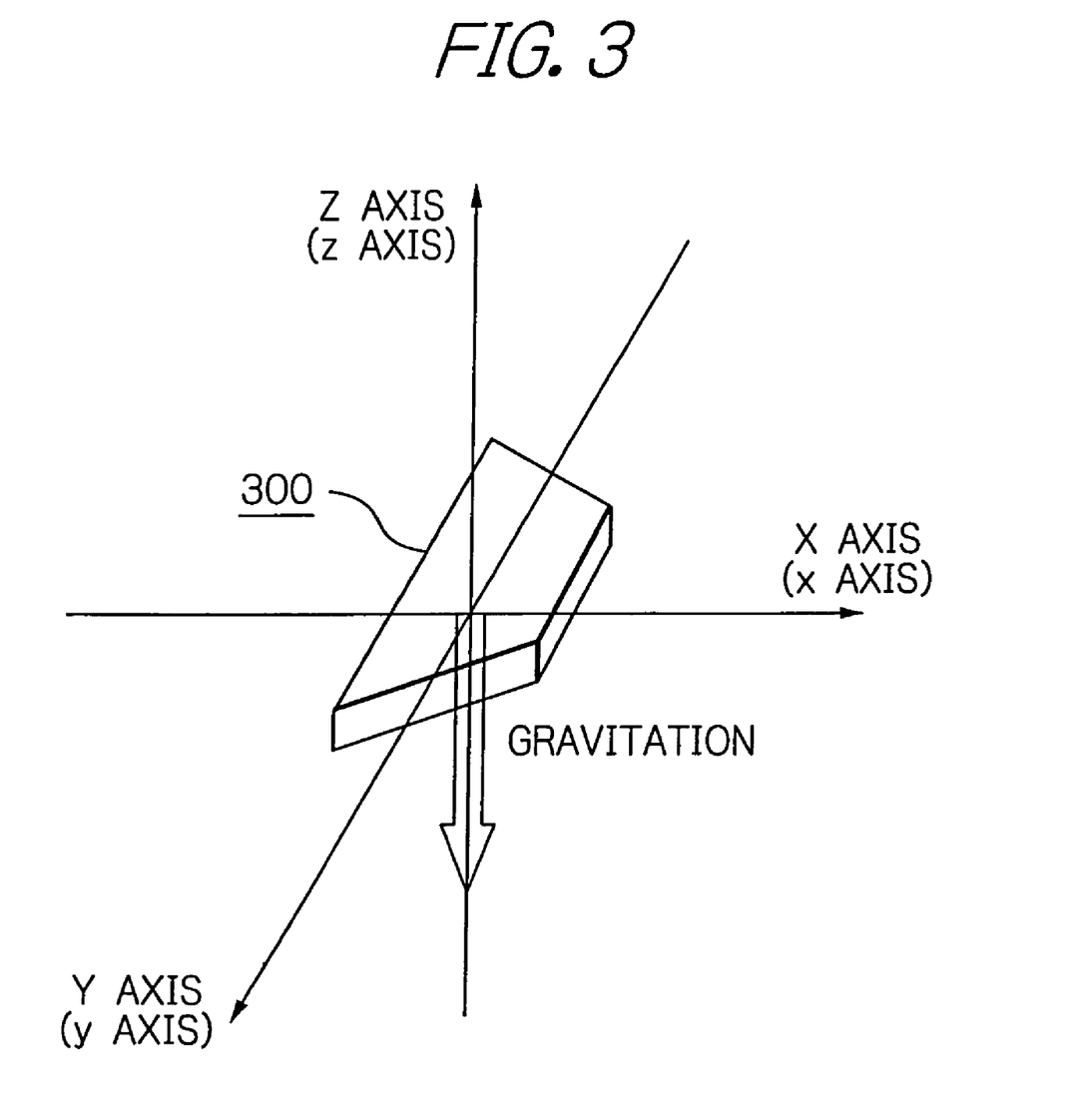
FIG. 3 is a perspective view showing an object having a conventional three-axis acceleration sensor mounted thereon.
Figure 4:
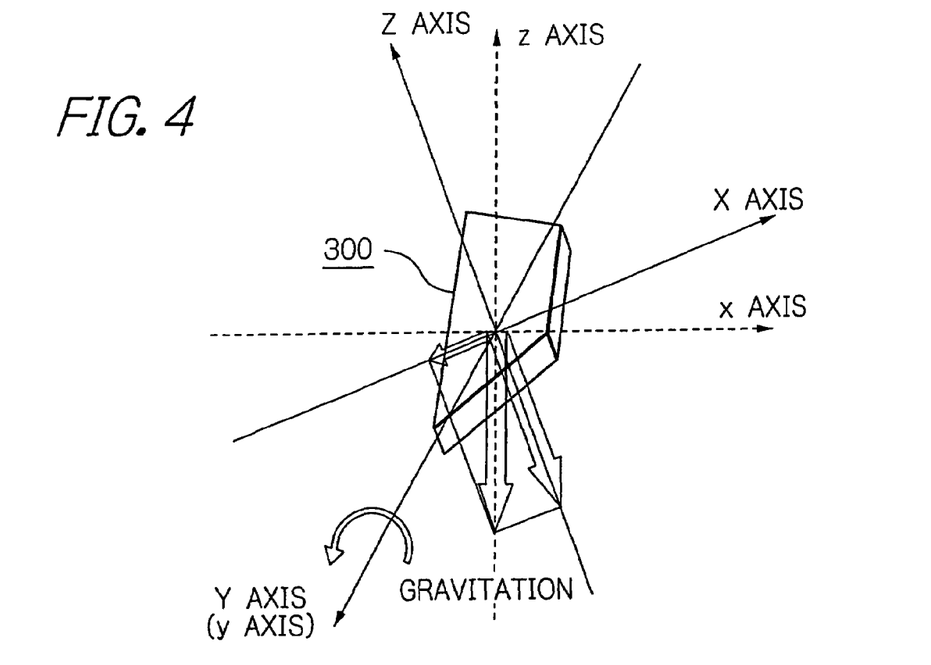
Figure 5:
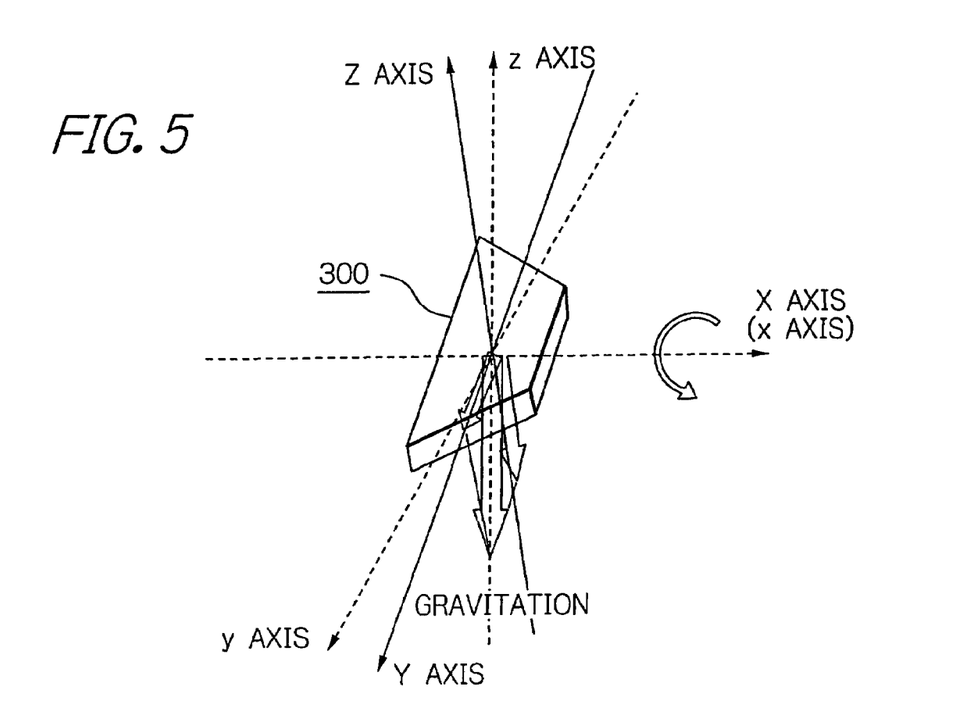

With reference to FIGS. 3, 4 and 5, a description will hereinafter be given of how an angle of inclination is measured with a conventional three-axis acceleration sensor.

As shown in FIG. 3, an object 300 with a three-axis acceleration sensor mounted thereon is disposed horizontally in an x-y-z axis space. In the x-y-z axis space, an axis whose direction is the same as the direction of gravitational acceleration is defined as the z axis, and a plane perpendicular to the z axis is defined as the x-y plane. The x and y axes are defined as intersecting with each other at right angles in the x-y plane. At this time, the X, Y, and Z axes shown in FIG. 3 are defined with the three-axis acceleration sensor of the object 300 as reference. More specifically, as previously described, the three-axis acceleration sensor is used to resolve and sense acceleration into three acceleration components in the X-, Y- and Z-axis directions, the X, Y and Z axes shown in FIG. 3 corresponding to the X, Y, and Z axes along which acceleration is resolved. Further, the X, Y, and Z axes in this example are disposed to coincide with the x, y, and z axes of the x-y-z axis space for the convenience of description. In this example, the state in which the object 300 is horizontally disposed is the state in which, among the acceleration components in the X-, Y- and Z-axis directions, only the gravitational acceleration component in the Z-axis direction is sensed by the three-axis acceleration sensor mounted on the object 300. A description will now be given in the case where, as shown in FIG. 4, the object 300 is rotated from the state of FIG. 3 with the Y axis as an axis of rotation. At this time, the angle formed between an axis projected onto the x-z plane of the x-y-z axis space from the X axis of the X-Z plane of the object 300 rotated about the Y and the x axis of the x-y-z axis space will hereinafter be referred to as a roll angle. In this example, the case of a roll angle being 30 degrees will be described.

The rotation from the state shown in FIG. 3 to the state shown in FIG. 4 is rotation about the Y axis. Therefore, even in FIG. 4 after rotation, no gravitational acceleration is sensed in the Y-axis direction. That is, in this example, because the X-Z plane of the object 300 overlaps with the x-z plane of the x-y-z axis space, the angle of rotation of the X axis is the roll angle of the object 300. Also, because the X-Z plane is rotated with respect to the x-z plane, the gravitation acceleration sensed only in the Z-axis direction in the state of FIG. 3 is now sensed and resolved into two acceleration components in the X-axis and Z-axis directions. At this time, the roll angle is calculated from the acceleration components detected in the X-axis and Z-axis directions, using a trigonometric function. In this example, since the object 300 is rotated 30 degrees about the Y axis, its roll angle is calculated as 30 degrees.

Next, a description will be given in the case where, as shown in FIG. 5, the object 300 is rotated from the state of FIG. 3 with the X axis as its axis of rotation. At this time, the angle formed between an axis projected onto the y-z plane of the x-y-z axis space from the Y axis of the Y-Z plane of the object 300 rotated about the X axis and the y axis of the x-y-z axis space will hereinafter be referred to as a pitch angle. In this example, the case of a pitch angle being 30 degrees will be described.

The rotation from the state shown in FIG. 3 to the state shown in FIG. 5 is rotation about the X axis, so that no gravitational acceleration is sensed in the X-axis direction even in the state shown in FIG. 5 after rotation. Specifically, in this example, because the Y-Z plane of the object 300 overlaps with the y-z plane of the x-y-z axis space, the angle of rotation of the Y axis is a pitch angle of the object 300. Also, because the y-z plane is rotated with respect to the Y-Z plane, the gravitation acceleration sensed only in the Z-axis direction in the state of FIG. 3 is now sensed and resolved into two acceleration components in the Y- and Z-axis directions. At this time, the pitch angle is calculated from the acceleration components detected in the Y- and Z-axis directions, using a trigonometric function. In this example, since the object 300 is rotated 30 degrees about the X axis, its pitch angle is calculated as 30 degrees.

Thus, which attitude the object 300 with the acceleration sensor assumes can be sensed by the two angles of inclination, the roll and pitch angles. At this time, the roll angle is calculated from the gravitational acceleration components detected in the X-axis and Z-axis directions, while the pitch angle is calculated from the gravitational acceleration components detected in the Y- and Z-axis directions.

In practice, the object 300 typically has its roll and pitch angles combined together. Even in such a case, the roll angle is calculated from the X- and Z-axis direction components of the gravitational acceleration, while the pitch angle is calculated from the Y- and Z-axis direction components of the gravitational acceleration.

However, in the case where the two angles of inclination are respectively calculated in the manner described above, errors may be caused. For example, in the case where the roll angle is measured when the pitch angle is nearly equal to 0 degrees, an error will not be large, but there is a problem that an error will be larger as the pitch angle is nearly equal to 90 degrees. Likewise, in the case where the pitch angle is calculated when the roll angle is nearly equal to 90 degrees, there will be a problem that an error becomes larger.

For example, Japanese patent laid-open publication No. 2000-180462 solves such problems by setting correction coefficients larger as the pitch and roll angles become larger, specifically in paragraphs [0017] to [0020] thereof.

However, in the method where an angle of inclination is divided into some sectors and appropriate correction coefficients are set to the sectors, errors within the individual sectors remain unsolved. As the number of the individual sectors is increased, the number of correction coefficients is increased. This results in an increase in storage capacity of the memory device and a reduction in calculation speed of a processing system.

SUMMARY OF THE INVENTION

It is therefore an object of the present invention to provide a calculator apparatus for calculating an angle of inclination capable of suppressing an increase in storage capacity and suppressing a reduction in calculation speed, as well as a method therefor.

In accordance with the present invention, a calculator apparatus for calculating an angle of inclination comprises a sensor device comprising a three-axis acceleration sensor for sensing acceleration and resolving the acceleration into a first acceleration component in a first axis direction, a second acceleration component in a second axis direction substantially perpendicular to the first axis direction, and a third acceleration component in a third axis direction substantially perpendicular to a plane formed by the first and second axes. The calculator apparatus further comprises a calculator for comparing absolute values of the first, second, and third acceleration components with each other, calculating a first angle of inclination from one of the three acceleration components that is largest in absolute value and one of the remaining two acceleration components, and calculating a second angle of inclination from the one acceleration component that is largest in absolute value and the other of the two acceleration components.

In accordance with the present invention, a method of calculating an inclination of an object comprises: a first step of sensing, by a three-axis acceleration sensor, when mounted on the object, gravitational acceleration of the object and resolving the acceleration into a first acceleration component in a first axis direction, a second acceleration component in a second axis direction substantially perpendicular to the first axis direction, and a third acceleration component in a third axis direction substantially perpendicular to a plane formed by the first and second axes, and outputting the first, second, and third acceleration components from the three-axis acceleration sensor; a second step of calculating a first angle of inclination of the object from absolute values of the first and second acceleration components, and calculating a second angle of inclination of the object from absolute values of the second and third acceleration components; and a third step of recalculating, when the absolute value of the second acceleration component is smaller than the absolute value of the first acceleration component, the first angle of inclination from the absolute values of the first and third acceleration components, and, when the absolute value of the third acceleration component is smaller than the absolute value of the second acceleration component, the second angle of inclination from the absolute values of the first and third acceleration components.

Thus, the calculator apparatus for calculating an angle of inclination and the method therefor in accordance with the present invention are capable of suppressing an increase in storage capacity and suppressing a reduction in calculation speed, compared with the conventional calculator architecture. The calculator apparatus for calculating an angle of inclination and the method of the present invention are also capable of accurately calculating an angle of inclination of an object on which an acceleration sensor is mounted.

BRIEF DESCRIPTION OF THE DRAWINGS

The objects and features of the present invention will become more apparent from consideration of the following detailed description taken in conjunction with the accompanying drawings in which:

FIGS. 4 and 5 show, similar to FIG. 3, the object rotated about the Y and X axes, respectively.

DESCRIPTION OF THE PREFERRED EMBODIMENTS

Figure 1:
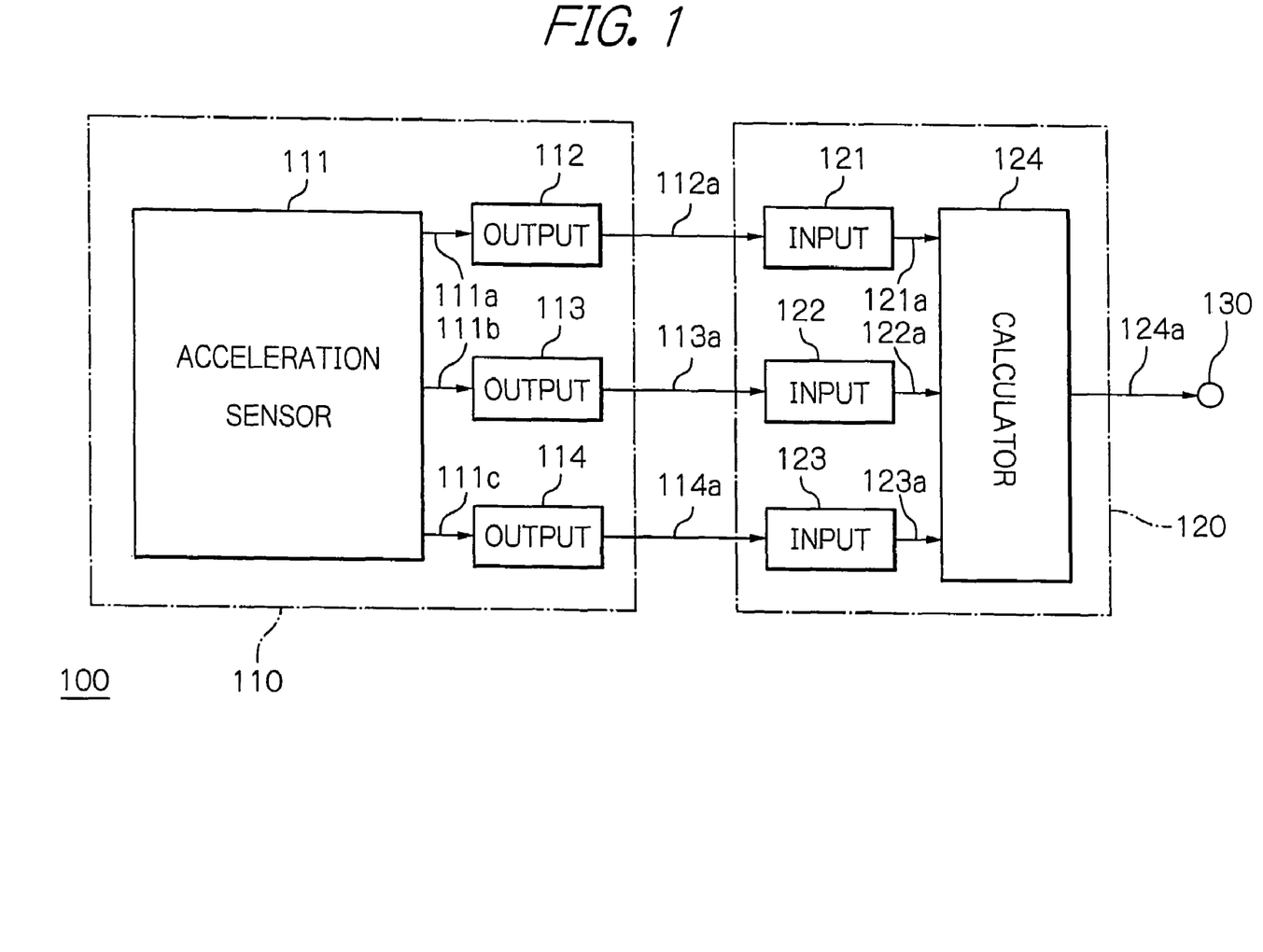
FIG. 1 is a schematic block diagram showing an embodiment of a calculator apparatus for calculating an angle of inclination in accordance with the present invention.

Referring initially to FIG. 1, there is depicted a preferred embodiment of a calculator apparatus for calculating an angle of inclination of the present invention, generally designated with a reference numeral 100. The calculator apparatus 100 generally includes a sensor section 110, a calculator section 120, and an output port 130, which are interconnected as illustrated. The calculator apparatus 100 is mounted on an object, not shown, examples of which are electronic equipment such as a cellular phone, a camera, a head-mount display, etc., and a vehicle such as a car, a ship, an airplane, etc. The calculator apparatus 100 is used to find how such an object is actually inclined.

The sensor section 110 includes a three-axis acceleration sensor 111 for sensing acceleration, a first output port 112 for outputting a first acceleration component in an X-axis direction sensed by the three-axis acceleration sensor 111 and output on a line 111a, a second output port 113 for outputting a second acceleration component in a Y-axis direction sensed by the sensor 111 and output on a line 111b, and a third output port 114 for outputting a third acceleration component in a Z-axis direction sensed by the sensor 111 and output on a line 111c. Signals are designated with reference numerals of connections on which they are conveyed.

The three-axis acceleration sensor 111 of the preferred embodiment comprises a pedestal, a weight, and a sensor section connected to the pedestal and the weight and having a piezoresistance sensor device, not specifically shown. In proportion to acceleration, the weight is displaced and the sensor section is deflected, whereby the resistance of the piezoresistance sensor device varies. By measuring a voltage across the piezoresistance sensor device having its resistance variable accordingly, acceleration can be sensed. This acceleration sensor is also able to resolve acceleration into a first acceleration component in an X-axis direction, a second acceleration component in a Y-axis direction perpendicular to the X-axis direction, and a third acceleration component in a Z-axis direction perpendicular to an X-Y plane formed by the X and Y axes, and sense the three acceleration components.

While the three-axis acceleration sensor 111 of the preferred embodiment is of an acceleration sensor with a piezoresistance sensor device, it is not limited to that type of sensor. Any types of three-axis acceleration sensor are well applicable if they are capable of resolving a given acceleration into three acceleration components in three-axis directions and outputting the three acceleration components. Such examples are different from each other in the type of acceleration sensing means, such as a capacitance type of three-axis acceleration sensor for sensing acceleration by the capacitance between spaced plates of a capacitor, and a piezoelectric three-axis acceleration sensor. The sensor section 110 may further include first, second, and third amplifiers, not shown, for amplifying the signals from the first, second, and third output ports 112, 113, and 114. The three-axis acceleration sensor 111 may be of the type which per se is conventionally known to those skilled in the art. To the acceleration sensor 111, applicable are the acceleration sensors disclosed by Japanese patent laid-open publication No. 2004-198243 and U.S. patent application publication No. US2005/0268717 A1 to Ozawa, for example.

The calculator section 120 has a first, a second and a third input port 121, 122 and 123, and an angle-of-inclination calculator 124, which are interconnected as illustrated. The first input port 121 is electrically connected to the first output port 112 via a line 112a, the second input port 122 is electrically connected to the second output port 113 via a line 113a, and the third input port 123 is electrically connected to the third output port 114 via a line 114a. The angle-of-inclination calculator 124 is electrically connected with the first input port 121, second input port 122, and third input port 123 via lines 121a, 122a, and 123a, respectively. The calculator section 120 may further have first, second, and third amplifiers, not shown, for amplifying the signals from the first input port 121, second input port 122, and third input port 123 and supplying the amplified signals to the angle-of-inclination calculator 124.

Now, the calculation of an angle of inclination will be described. For clarity, a description will be given in the case where the attitude of an object with the calculator apparatus 100 varies in the x-, y- and z-axis positive directions in the x-y-z axis space. Since the application to the entire x-y-z axis space can be easily extended from the positive and negative of the gravitational acceleration components in the X-, Y- and Z-axis directions, a description of the entire x-y-z axis space may sometimes be omitted. The calculator apparatus may be carried on an object like what was described earlier as the object 300, FIGS. 3, 4 and 5. The following description will be directed to the case where the calculator apparatus 300 is mounted on the object 300.

Initially, using the absolute value |AX| of a gravitational acceleration component AX in the X-axis direction and the absolute value |AZ| of a gravitational acceleration component AZ in the Z-axis direction, a roll angle R is calculated by R=ATAN(|AX|/|AZ|) in which ATAN is an arctangent function. In the case of |AX|>|AZ|, a roll angle R is calculated by R=90−ATAN(|AZ|/|AY|).

Next, using the absolute value |AY| of a gravitational acceleration component AY in the Y-axis direction and the absolute value |AZ|, a pitch angle P is calculated by P=ATAN(|AY|/|AZ|) in which ATAN is an arctangent function. In the case of |AY|>|AZ|, a pitch angle P is calculated by P=90−ATAN(|AZ|/|AY|).

When a roll angle R is 45 degrees or greater, a pitch angle P is recalculated. The recalculation of a pitch angle P is performed by P=ATAN(|AY|/|AX|). That is, a pitch angle P is recalculated from the gravitational acceleration components in the X-axis direction and Y-axis direction.

When a pitch angle P is 45 degrees or greater, a roll angle R is recalculated. The recalculation of a roll angle R is performed by R=ATAN(|AY|/|AX|). That is to say, a roll angle R is recalculated from the gravitational acceleration components in the X-axis direction and Y-axis direction.

In the preferred embodiment, although an angle of inclination is calculated by using ATAN, the present invention is not limited to it. The calculation of an angle of inclination may be performed by using ASIN (arcsine) or ACOS (arccosine)

The calculator apparatus for calculating an angle of inclination 100 of the present invention is used to sense in which direction an object with the unit 100 is inclined, so that there is no possibility that the two recalculations described above will be simultaneously performed.

The conditions for recalculation of the present invention are as follows. If an angle of inclination is calculated by using the gravitational acceleration components in two axis directions other than the gravitational acceleration component in an axis direction that is largest in absolute value, an error will become large. Because of this, when calculating a roll and a pitch angle, both of the two angles are calculated by using the gravitational acceleration component in an axis direction that is largest in absolute value. For example, when the absolute value of the gravitational acceleration component in the X-axis direction is largest, each of the two angles is calculated by using the gravitational acceleration component in the X-axis direction. When the absolute values of the gravitational acceleration components in two axis directions are the same and largest, or when the absolute values of the gravitational acceleration components in three axis directions are the same, any one of the gravitational acceleration components is suitably selected.

Further, in the calculator apparatus for calculating an angle of inclination 100 of the present invention, it is preferable to mount the acceleration sensor 100 on an object so that the angle of inclination of the acceleration sensor coincides with that of the object. In an application where the angle of inclination of the acceleration sensor 100 does not coincide with that of the object, it is preferable to add the difference to the angle of inclination of the acceleration sensor calculated and output the corrected angle of inclination.

The angles of inclination of the object thus calculated are output from the output port 130 over a line 124a. A plurality of output ports 130 may be provided, and in that case they may be provided so as to correspond to the number of angles of inclination calculated.

Thus, according to the preferred embodiment of the calculator apparatus for calculating an angle of inclination, an angle of inclination is not divided into some sectors, and without setting appropriate correction coefficients to the respective sectors, the calculation of the angle of inclination is possible. Therefore, angles of inclination in the entire range can be calculated with a high degree of accuracy without causing an increase in storage capacity and a reduction in calculation speed due to the use of correction coefficients.

In addition, a roll angle is calculated by using the gravitational acceleration component in the X-axis direction and the gravitational acceleration component in the Z-axis direction, while a pitch angle is calculated by using the gravitational acceleration component in the Y-axis direction and the gravitational acceleration component in the Z-axis direction. Thus, the axis directions required for the calculations of the roll and pitch angles are determined from output accuracy without fixing an axis in which an angle of inclination is calculated, so that angles of inclination can be calculated with a higher degree of accuracy.

Figure 2:
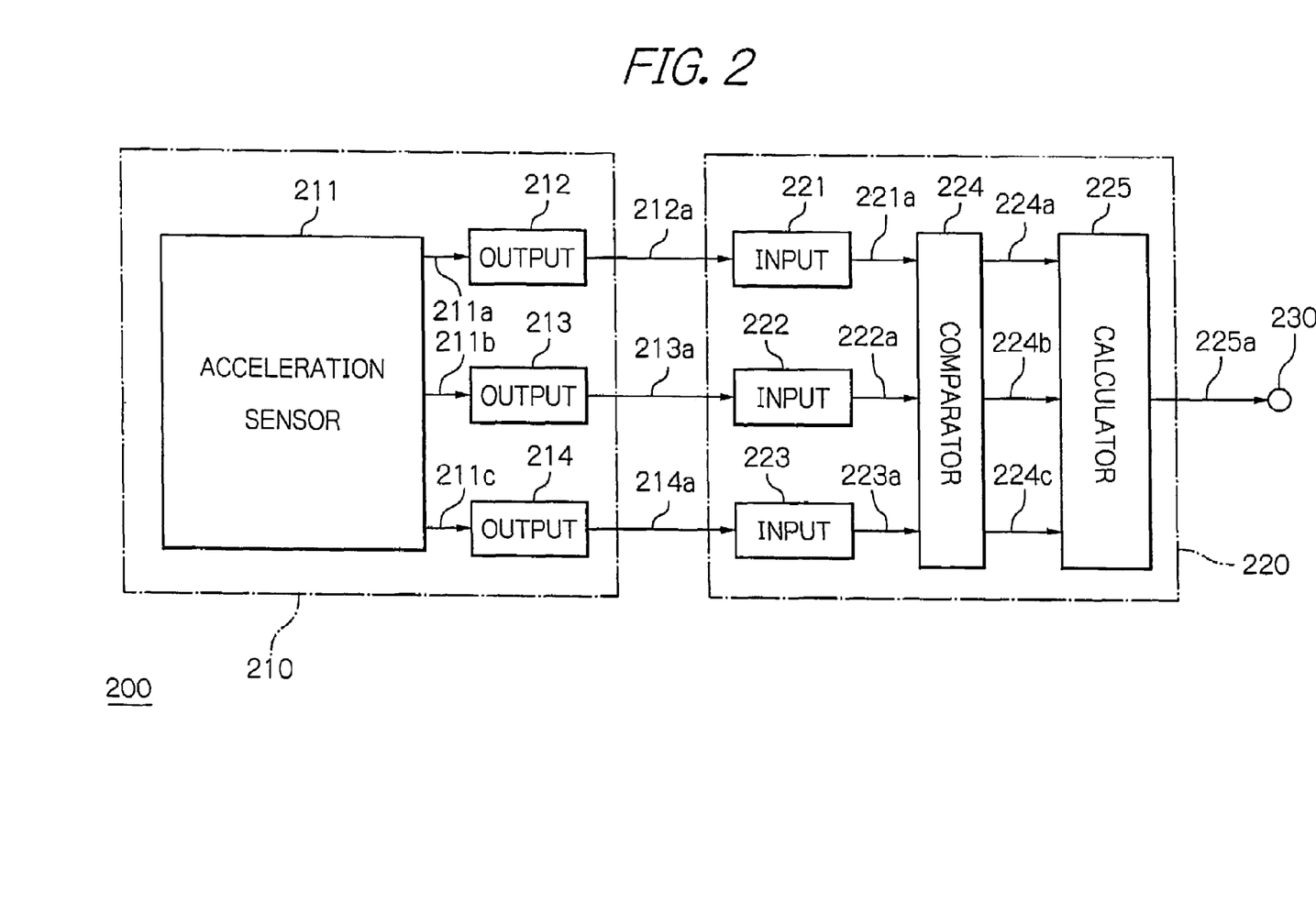
FIG. 2 is a schematic block diagram showing an alternative embodiment of the calculator apparatus for calculating an angle of inclination in accordance with the present invention.

Referring now to FIG. 2, there is depicted an alternative preferred embodiment of the calculator apparatus, generally 200, for calculating an angle of inclination of the present invention. The calculator apparatus 200 includes a sensor section 210, a calculator section 220, and an output port 230, which are interconnected as illustrated. The calculator apparatus 200 is mounted on an object whose angle of inclination is to be calculated. Since the object may be the same as the embodiment shown in FIG. 1, a detailed description thereof will not be given.

The sensor section 210 includes a three-axis acceleration sensor 211 for sensing acceleration, a first output port 212 for outputting the first acceleration component in an X-axis direction sensed by the three-axis acceleration sensor 211 and output over a line 211a, a second output port 213 for outputting the second acceleration component in a Y-axis direction sensed by the three-axis acceleration sensor 211 and output over a line 211b, and a third output port 214 for outputting the third acceleration component in a Z-axis direction sensed by the three-axis acceleration sensor 211 and output over a line 211c. Since the sensor section 210 may be the same in configuration as the sensor section 110 shown in FIG. 1, a detailed description of the sensor section 210 will not be given. Like components are designated with the same reference numerals, and repetitive description will be avoided.

The calculator section 220 includes a first input port 221, a second input port 222, a third input port 223, a comparator 224, and an angle-of-inclination calculator 225, which are interconnected as depicted. Since the first, second and third input ports 221, 222 and 223, and lines 212a, 213a and 214a may be the same in configuration as the first, second and third input ports 121, 122 and 123, and lines 112a, 113a and 114a shown in FIG. 1, respectively, a detailed description of them will not be given.

The comparator 224 is adapted for receiving the signals from the first, second and third input ports 221, 222 and 223 over lines 221a, 222a and 223a, respectively, and comparing the absolute values of the first, second and third gravitational acceleration components in the X-, Y- and Z-axis directions, respectively, to select one of the three axis directions in which the absolute value of the gravitational acceleration component is largest. The comparator 224 outputs the absolute value of the gravitational acceleration components of X-, Y-, and Z-axis directions over lines 224a, 224b and 224c, respectively. One of the lines 224a, 224b and 224c which corresponds to the selected direction also conveys a signal denoting the selected direction.

The angle-of-inclination calculator 225 is adapted for calculating a first angle of inclination from the absolute values of the gravitational acceleration components in the axis direction selected by the comparator 224 and in one direction of the remaining two axis directions, and calculating a second angle of inclination from the absolute values of the gravitational acceleration components in the axis direction selected by the comparator 224 and in the other direction of the two axis directions. For instance, in the case where the absolute value of the gravitational acceleration component in the X-axis direction is largest, the comparator 224 selects the X-axis direction and the angle-of-inclination calculator 225 calculates one of the two angles of inclination from the absolute values of the gravitational acceleration components in the X- and Y-axis directions, and calculates the other angle of inclination from the absolute values of the gravitational acceleration components in the X- and Z-axis directions.

In the case where the absolute value of the gravitational acceleration component in the X-axis direction is largest, a roll angle R is calculated by $R=ATAN(|AZ|/|AX|)$ in which ATAN is an arctangent function, the term $|AZ|$ represents the absolute value of the gravitational acceleration component AZ in the Z-axis direction, and the term $|AX|$ does the absolute value of the gravitational acceleration component AX in the X-axis direction. A pitch angle P is calculated by $P=ATAN(|AY|/|AX|)$ in which ATAN is an arctangent function, the term $|AY|$ represents the absolute value of the gravitational acceleration component AY in the Y-axis direction, and the term $|AX|$ does the absolute value of the gravitational acceleration component AX in the X-axis direction.

In the case where the absolute value of the gravitational acceleration component in the Y-axis direction is largest, a roll angle R is calculated by $R=ATAN(|AX|/|AY|)$ where ATAN is an arctangent function, the term $|AX|$ represents the absolute value of the gravitational acceleration component AX in the X-axis direction, and the term $|AY|$ does the absolute value of the gravitational acceleration component AY in the Y-axis direction. A pitch angle P is calculated by $P=ATAN(|AZ|/|AY|)$ where ATAN is an arctangent function, the term $|AZ|$ represents the absolute value of the gravitational acceleration component AZ in the Z-axis direction, and the term $|AY|$ represents the absolute value of the gravitational acceleration component AY in the Y-axis direction.

In the case where the absolute value of the gravitational acceleration component in the Z-axis direction is largest, a roll angle R is calculated by $R=ATAN(|AX|/|AZ|)$ in which ATAN is an arctangent function, the term $|AX|$ represents the absolute value of the gravitational acceleration component AX in the X-axis direction, and the term $|AZ|$ does the absolute value of the gravitational acceleration component AZ in the Z-axis direction. A pitch angle P is calculated by $P=ATAN(|AY|/|AZ|)$ in which ATAN is an arctangent function, the term $|AY|$ represents the absolute value of the gravitational acceleration component AY in the Y-axis direction, and the term $|AZ|$ does the absolute value of the gravitational acceleration component AZ in the Z-axis direction.

As with the illustrative embodiment shown in FIG. 1, when the absolute values of the gravitational acceleration components in two axis directions are the same and largest, or when the absolute values of the gravitational acceleration components in three axis directions are the same, any one of the gravitational acceleration components is suitably selected. Further, in the calculator apparatus for calculating an angle of inclination 200 of the present invention, it is preferable to mount the acceleration sensor in an object so that the angle of inclination of the acceleration sensor coincides with that of the object. In an application where the angle of inclination of the acceleration sensor does not coincide with that of the object, it is preferable to add the difference to the angle of inclination of the acceleration sensor calculated and output the corrected angle of inclination.

The angles of inclination of the object thus calculated are output from the output port 230 over a line 225a. A plurality of output ports 230 may be provided, and in that case they may be provided so as to correspond to the number of angles of inclination calculated.

As has been described hereinabove, the alternative embodiment of the calculator apparatus for calculating an angle of inclination has the same advantages as the illustrative preferred embodiment shown in and described with reference to FIG. 1. Further, compared with the preferred embodiment shown in FIG. 1, the number of calculations for angles of inclination can be reduced, whereby the calculation process can be performed at higher speed.

In accordance with one aspect of the present invention, there is provided a method of calculating an inclination of an object, comprising: a first step of resolving and sensing, by a three-axis acceleration sensor, when mounted on the object, gravitational acceleration of the object into a first acceleration component in a first axis direction, a second acceleration component in a second axis direction substantially perpendicular to the first axis direction, and a third acceleration component in a third axis direction substantially perpendicular to a plane formed by the first and second axes, and outputting the first, second, and third acceleration components from the three-axis acceleration sensor; a second step of calculating a first angle of inclination of the object from absolute values of the first and second acceleration components, and calculating a second angle of inclination of the object from absolute values of the second and third acceleration components; and a third step of recalculating, when the absolute value of the second acceleration component is smaller than the absolute value of the first acceleration component, the first angle of inclination from the absolute values of the first and third acceleration components, and, when the absolute value of the third acceleration component is smaller than the absolute value of the second acceleration component, the second angle of inclination from the absolute values of the first and third acceleration components.

In accordance with another aspect of the present invention, in the method, the first angle of inclination a roll angle of the object and the second angle of inclination is a pitch angle of the object.

In accordance with a further aspect of the present invention, there is provided a method of calculating inclination, comprising: a first step of sensing, by a three-axis acceleration sensor, when mounted on the object, gravitational acceleration and resolving the acceleration into a first acceleration component in a first axis direction, a second acceleration component in a second axis direction substantially perpendicular to the first axis direction, and a third acceleration component in a third axis direction substantially perpendicular to a plane formed by the first and second axes, and outputting the first, second, and third acceleration components from the three-axis acceleration sensor; a second step of comparing absolute values of the first, second, and third acceleration components with each other, and selecting largest one of the first, second and third acceleration components in absolute value; a third step of calculating a first angle of inclination from the selected acceleration component and one of remaining two of the first, second and third acceleration components, and calculating a second angle of inclination from the selected acceleration component and another of the remaining two acceleration components.

In accordance with one aspect of the present invention, there is provided a method of calculating an inclination of an object, comprising: a first step of resolving and sensing, by a three-axis acceleration sensor, when mounted on the object, gravitational acceleration of the object into a first acceleration component in a first axis direction, a second acceleration component in a second axis direction substantially perpendicular to the first axis direction, and a third acceleration component in a third axis direction substantially perpendicular to a plane formed by the first and second axes, and outputting the first, second, and third acceleration components from the three-axis acceleration sensor; a second step of calculating a first angle of inclination of the object from absolute values of the first and second acceleration components, and calculating a second angle of inclination of the object from absolute values of the second and third acceleration components; and a third step of recalculating, when the absolute value of the second acceleration component is smaller than the absolute value of the first acceleration component, the first angle of inclination from the absolute values of the first and third acceleration components, and, when the absolute value of the third acceleration component is smaller than the absolute value of the second acceleration component, the second angle of inclination from the absolute values of the first and third acceleration components.

In accordance with another aspect of the present invention, in the method, the first angle of inclination a roll angle of the object and the second angle of inclination is a pitch angle of the object.

In accordance with a further aspect of the present invention, there is provided a method of calculating inclination, comprising: a first step of sensing, by a three-axis acceleration sensor, when mounted on the object, gravitational acceleration and resolving the acceleration into a first acceleration component in a first axis direction, a second acceleration component in a second axis direction substantially perpendicular to the first axis direction, and a third acceleration component in a third axis direction substantially perpendicular to a plane formed by the first and second axes, and outputting the first, second, and third acceleration components from the three-axis acceleration sensor; a second step of comparing absolute values of the first, second, and third acceleration components with each other, and selecting largest one of the first, second and third acceleration components in absolute value; a third step of calculating a first angle of inclination from the selected acceleration component and one of remaining two of the first, second and third acceleration components, and calculating a second angle of inclination from the selected acceleration component and another of the remaining two acceleration components.

In the method described in the immediatly preceding paragraph, said third step calculates the first and second angels of inclination of an object on which the accelerationn sensor In the method described in the immediately preceding paragraph, the first angle of inclination is a roll angle of the object and the second angle of inclination is a pitch angle of the object.

The entire disclosure of Japanese patent application No. 2006-103250 filed on Apr. 4, 2006, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. A calculator apparatus for calculating an angle of inclination, comprising:

a sensor device comprising a three-axis acceleration sensor for sensing acceleration and resolving the acceleration into a first acceleration component in a first axis direction, a second acceleration component in a second axis direction substantially perpendicular to the first axis direction, and a third acceleration component in a third axis direction substantially perpendicular to a plane formed by the first and second axes; and a calculator for comparing absolute values of the first, second, and third acceleration components with each other, calculating a first angle of inclination from largest one of the first, second and third acceleration components in absolute value and one of remaining two of the first, second and third acceleration components, and calculating a second angle of inclination from the largest acceleration component in absolute value and another of the remaining two acceleration components.

2. The apparatus in accordance with claim 1, wherein the acceleration is gravitational acceleration.

3. The apparatus in accordance with claim 1, wherein said calculator calculates the first and second angles of inclination of an object when said calculator apparatus is mounted on the object.

4. A calculator apparatus for calculating an angle of inclination to be mounted on an object, comprising:

a sensor device comprising a three-axis acceleration sensor for sensing gravitational acceleration applied to the object, when said apparatus is mounted on the object, and resolving the gravitational acceleration, into a first acceleration component in a first axis direction, a second acceleration component in a second axis direction substantially perpendicular to the first axis direction, and a third acceleration component in a third axis direction substantially perpendicular to a plane formed by the first and second axes; and a calculator for comparing absolute values of the first, second, and third acceleration components with each other, calculating a first angle of inclination of the object, when said apparatus is mounted on the object, from largest one of the first, second and third acceleration components in absolute value and one of remaining two of the first, second and third acceleration components, and calculating a second angle of inclination of the object, when said apparatus is mounted on the object, from the largest acceleration component in absolute value and another of the remaining two acceleration components.

5. The apparatus in accordance with claim 4, wherein the first angle of inclination is a roll angle of the object and the second angle of inclination is a pitch angle of the object when said apparatus is mounted on the object.

* * * * *